US006267274B1

(12) United States Patent
Smrt (10) Patent No.: US 6,267,274 B1
(45) Date of Patent: Jul. 31, 2001

(54) APPARATUS AND RELATED METHOD FOR SELECTIVELY INCREASING THE HUMIDITY IN A PREDETERMINED ZONE

(76) Inventor: Thomas J. Smrt, 9716 S. Grant Hwy., Marengo, IL (US) 60152

( * ) Notice: Subject to any disclaimer, the term of this patent is extended or adjusted under 35 U.S.C. 154(b) by 0 days.

(21) Appl. No.: 09/603,003

(22) Filed: Jun. 26, 2000

Related U.S. Application Data

(63) Continuation-in-part of application No. 09/437,859, filed on Nov. 10, 1999.
(51) Int. Cl.[7] ....................................................... B67D 5/00
(52) U.S. Cl. .............................. 222/646; 222/52; 222/649
(58) Field of Search ................................... 222/645–649, 222/52

(56) References Cited

U.S. PATENT DOCUMENTS 4,139,607 * 2/1979 Simons et al. .......................... 424/45
4,582,054 * 4/1986 Ferrer .............................. 128/200.23
5,727,715 * 3/1998 McKenna et al. .............. 222/189.09
5,944,284 * 8/1999 Bardel ................................ 244/118.5

* cited by examiner

Primary Examiner—J. Casimer Jacyna
(74) Attorney, Agent, or Firm—Leydig, Voit & Mayer, Ltd.

(57) ABSTRACT

The present invention provides an apparatus and related method for selectively increasing the humidity in a predetermined zone. The apparatus is a disposable, hand-held, aerosol-type, pressurized container comprising a disposable, hand-held, aerosol-type container; an aerosol composition consisting essentially of water and a liquid propellant in the container; a valve; and an actuator. The present invention also provides a method for increasing the humidity in a predetermined zone from a disposable, hand-held, aerosol-type, pressurized container. The method comprises sensing the humidity in a predetermined zone for a selected humidity level and dispensing a composition consisting essentially of water and a liquid propellant from a disposable, hand-held, aerosol-type pressurized container into the predetermined zone to when the selected humidity level is sensed.

14 Claims, 4 Drawing Sheets

APPARATUS AND RELATED METHOD FOR SELECTIVELY INCREASING THE HUMIDITY IN A PREDETERMINED ZONE

RELATED APPLICATIONS

This application is a continuation-in-part of U.S. patent application Ser. No. 09/437,859, filed Nov. 10, 1999, and still pending, the entirety of which is hereby incorporated by reference.

TECHNICAL FIELD OF THE INVENTION

This invention generally relates to an apparatus and related method for providing adjustment of the humidity level in an environmental zone.

BACKGROUND OF THE INVENTION

In certain circumstances, the amount of humidity in an open or enclosed space can reach undesirably low levels. For example, the open atmosphere during the winter months is often described as having cold, dry air. The description of cold, dry air during winter months is based on a general principle of thermodynamics, warm air retains more moisture than cold air because the absolute humidity level of air is directly proportional to the temperature of the air. Accordingly, cold air during the winter months often has a lower absolute humidity level than warm air during the summer months.

In addition to cold, dry air found in open spaces, many enclosed spaces also experience undesirably low humidity levels, especially during the winter months when the air in the enclosed space is being heated. This is due in part to the low humidity ratios of outdoor air supplied to widely-used forced air heating systems, as well as electrically resistive heating systems found in many hotel, office, and commercial buildings.

Many times, the humidity of an open or enclosed space may have the overall desired level of humidity, but pockets of dry air, or zones, within the open or enclosed space may have undesirably low levels of humidity. These zones may be caused by temperature gradients from external sources, e.g., convection heater. or an individual may desire more humidity within a particular zone, such as a zone within the immediate area of the individual.

Significant problems are associated with low humidity, including aggravation of existing skin or respiratory problems, and an undesirably high static electricity buildup in clothing and other personal accessories.

Air humidifiers are well known in the art, and are used to control the humidity level of air in enclosed spaces, such as buildings, hotel rooms, homes, offices, and the like. Typically, these air humidifiers are permanent fixtures and are not designed for portable use.

While portable humidifiers are known, they typically require the user to supply the water source by filling a reservoir, hence eliminating any use of the humidifier when an external water source is absent, e.g., when driving an automobile. Some of these reservoirs are rigid and bulky, making them awkward to carry. In other portable humidifiers, the reservoir is flaccid, making the shape of the reservoir inconsistent and cumbersome to handle. A further problem associated with portable humidifiers having a refillable water reservoir is the risk of contamination of both the water and the reservoir by physical, biological or chemical pollutants.

Moreover, portable humidifiers commonly require a source of external power, e.g., from an electrical outlet or a battery pack. The requirement for having an external power supply increases the complexity of the portable humidifier, thereby increasing the cost and maintenance of the device.

Thus, a need exists for an apparatus and method which can be used to increase the humidity in a zone having undesirably low humidity levels which overcomes the foregoing and other disadvantages of presently available portable humidifiers.

BRIEF SUMMARY OF THE INVENTION

In one aspect, the invention provides a disposable, hand-held, aerosol-type, pressurized container and apparatus for selectively increasing the humidity in a predetermined zone. The pressurized container comprises a disposable, hand-held, aerosol-type container; an aerosol composition consisting essentially of water and a liquid propellant in the container; a valve; and an actuator. The valve comprises an inlet and an outlet for controlling the discharge of the aerosol composition from the container, the valve being biased in a non-discharging position and being movable to a discharging position. The inlet of the valve is in communication with the container such that the aerosol composition can flow from the container through the valve. Moreover, the actuator is in fluid communication with the outlet of the valve such that the aerosol composition can flow from the outlet of the valve through the actuator and outwardly from the container, wherein movement of the actuator results in movement of the valve into a discharging position. The combination of the valve, the actuator, and the liquid propellant cooperate to discharge the aerosol composition from the container as an aerosolized liquid when the valve is moved into the discharging position.

In another aspect, the present invention provides a method for increasing the humidity in a predetermined zone from a disposable, hand-held, aerosol-type, pressurized container. The method comprises sensing a pre-selected condition in a predetermined zone and dispensing a composition consisting essentially of water and a liquid propellant from a disposable, hand-held, aerosol-type pressurized container into the predetermined zone when the pre-selected condition is sensed.

DETAILED DESCRIPTION OF THE PREFERRED EMBODIMENTS

While the invention will be described in connection with certain preferred embodiments, the invention is not intended to be so limited. On the contrary, the invention is intended to cover all alternatives, modifications, and equivalent arrangements as may be included within the spirit and scope of the invention as defined by the appended claims.

The present invention contemplates an apparatus and method for selectively increasing the humidity in a predetermined zone. Therefore, in accordance with one preferred embodiment of the present invention, there is provided a disposable, hand-held, aerosol-type, pressurized container comprising a disposable, hand-held, aerosol-type container; an aerosol composition consisting essentially of water and a liquid propellant in the container; a valve; and an actuator. The ability to overcome the aforementioned concerns by use of the apparatus and method of the present invention, which provide an economical and elegantly simple solution, would be of great benefit.

Turning initially to the pressurized container, the present invention contemplates a disposable, hand-held, aerosol-type pressurized container.

Figures 1, 2:
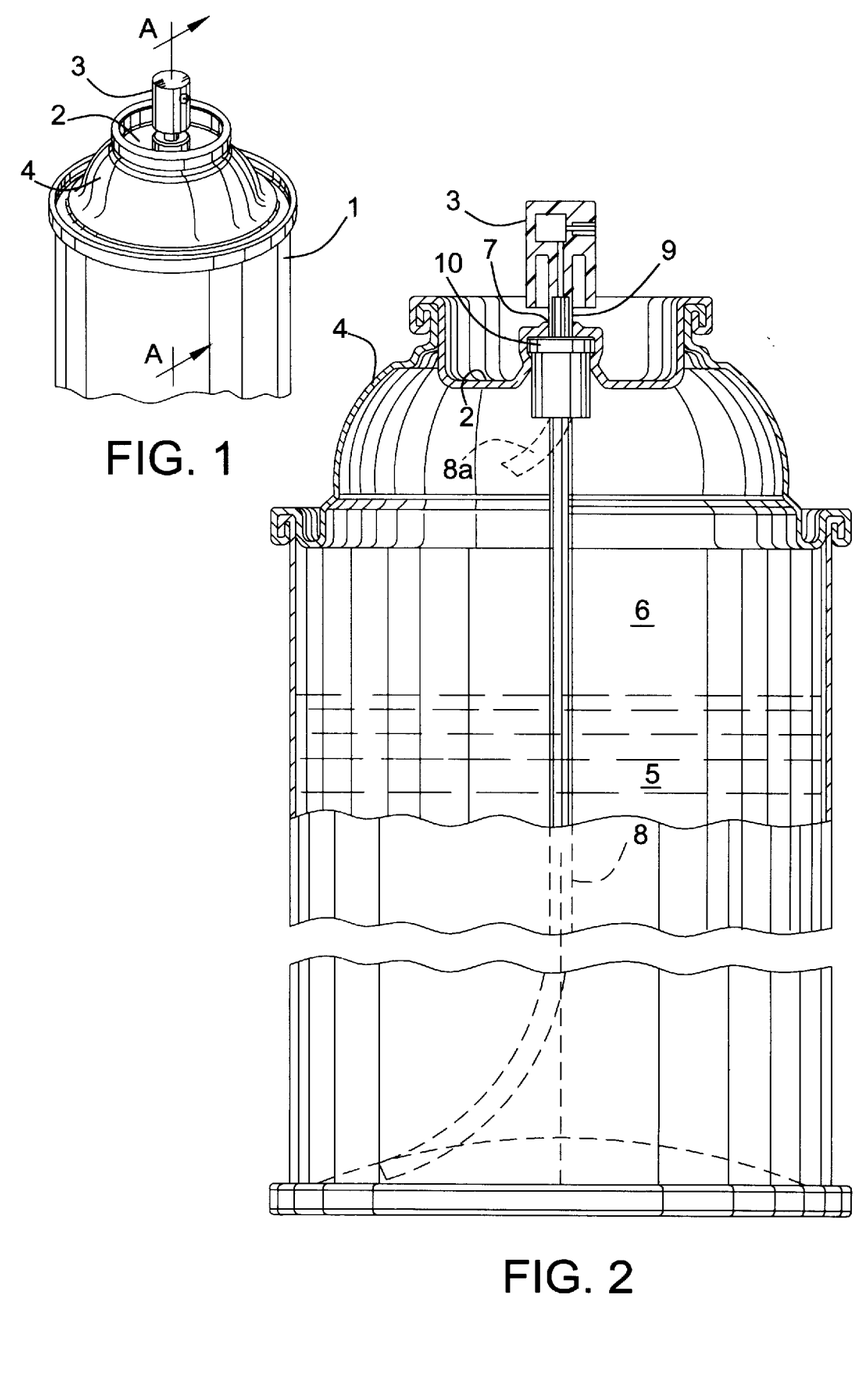
FIG. 1 is a perspective view of a preferred embodiment of the disposable, hand-held, aerosol-type, pressurized container of the present invention.
FIG. 2 is a vertical cross-section of FIG. 1 along section line A—A.

Referring to FIG. 1, there is illustrated a preferred embodiment of the pressurized container. As shown in the drawing, the pressurized container can be used with conventional aerosol containers 1 which are pressurized upon being filled with water.

The conventional aerosol containers, which are typically used to hold aerosol paints, are preferred because they are relatively inexpensive, and allow a consumer to readily transport and dispose one container for a new container after a particular container is fully discharged. While the container may be of any suitable design and may have any shape desired other than that shown, the container 1 illustrated is, by way of example, a commonly known pressurized container used for the containment of various liquids. The containers are generally made from metals, although other materials, such as plastics, may also be used provided they are inert in regards to the contents of the container. Inasmuch as pressurized containers of this type are well known and readily available, these containers are preferred. It should be appreciated, however, that any type of container that is compatible with this and other aspects of the present invention may be utilized.

The pressurized container is shown in greater detail in FIG. 2, the reference numerals of FIG. 1 being used in the same manner. The container 1 is closed at its top by a discharging apparatus which comprises a recessed valve mounting cup 2, a valve 10, and an actuator 3, the cup being secured to the domed top wall 4 at one end of the container body by means of a crimping operation. The main body portion of the container 1 contains a body of liquid 5 to be dispensed, the liquid being maintained under a pressure which is greater than atmospheric by means of one or more liquid propellants 6.

The mounting cup 2 as illustrated is a form of cup well known to those skilled in the art. This cup is adapted to close the open end of the container 1 through which the contents of the container are inserted during processing. The cup 2 is circular and has a central socket 7 which receives and retains a suitable actuator 3 which controls the discharge of liquid from the container.

Valve 10 constitutes those valves commonly used in aerosol paint containers, and are well known. Because such valves are well known, interior portions of valve 10 are not shown in the drawing. Typically, these valves include an inlet and an outlet for controlling the discharge of the aerosol composition from the container. Valve 10 is biased in a non-discharging position and is movable to a discharging position. The inlet valve is in communication with the container such that the aerosol composition can flow from the container through the valve. Preferably, the valve is mounted onto the container.

Actuator 3 is in fluid communication with the outlet of valve 10 such that the aerosol composition can flow from the outlet of valve 10 through actuator 3 and outwardly from the container. The movement of actuator 3 results in movement of valve 10 into the discharging position. Preferably, the actuator is mounted onto the valve.

The discharge apparatus further includes a dip tube 8 which extends downwardly from the body of valve 10 into the container 1 such that substantially all of the liquid 5 in the container 1 is capable of being discharged from the container during use. Tube 8 is commonly a slightly bowed, flexible member made of a synthetic resin or plastic which is inert with respect to the contents of the container. The bowing of tube 8 allows the tube to reach the liquid residing in the lowest part of the container. Thus, substantially all of the liquid residing within the container can be discharged, assuming an adequate supply of propellant, by providing a label on the exterior surface of the container indicating in which direction the actuator should be positioned during discharge.

Alternatively, the particular discharge apparatus illustrated can be adapted to spray the contents of the container while in an inverted position. In this alternative embodiment, the discharge apparatus includes a very short dip tube 8a (in phantom), and the contents of the container are expelled by the liquid propellant when external pressure is exerted on the valve while the container is inverted.

In addition to the dip tube 8 and actuator 3, the discharge apparatus further includes an actuator stem 9 which is hollow and projects from the body of actuator 3 which is secured within valve 10 by a friction fit operation. The actuator stem 9 is hollow and adapted for opening the valve by being moved toward the valve by external pressure, i.e., downwardly in the direction of the container 1. When valve is open, liquid 5 is forced by the liquid propellant through an open end of the tube 8 and outward of the container 1 through the hollow stem 9. In other words, the combination of the valve, the actuator, and the liquid propellant cooperate to discharge the aerosol composition from the container as an aerosolized liquid when the valve is moved into the discharging position.

The present invention further contemplates an apparatus and method for selectively increasing the humidity in a predetermined zone from a disposable, hand-held, aerosol-type, pressurized container. The apparatus includes the disposable, hand-held, aerosol-type, pressurized container may be of the type and form previously described herein. The apparatus further includes means for mounting the pressurized container, an electrically-operable actuator and a sensor.

Turning now to FIGS. 3–5, there is illustrated a preferred embodiment of the apparatus 20 for selectively increasing the humidity in a predetermined zone.

As shown in the drawings, the apparatus can be used with the pressurized containers 1 previously described herein. These containers are preferred because they are relatively inexpensive, and allow a consumer to readily transport and change-out one container for a new container after a particular container is fully discharged. It should be appreciated, however, that any type of container that is compatible with this and other aspects of the present invention may be utilized.

The dispensing apparatus 20 includes means for mounting the container 1 which allows the aerosol composition that is discharged from the pressurized container to be dispensed into the predetermined zone. As will be appreciated by those skilled in the art, there are any number of different configurations of mounting structures, and mounting positions, that can be used to mount the container such that it will dispense the aerosol composition into the predetermined zone. Preferably, the mounting means is configured such that the container can be easily removed and replaced when the aerosol composition in the container is exhausted.

Figure 3:
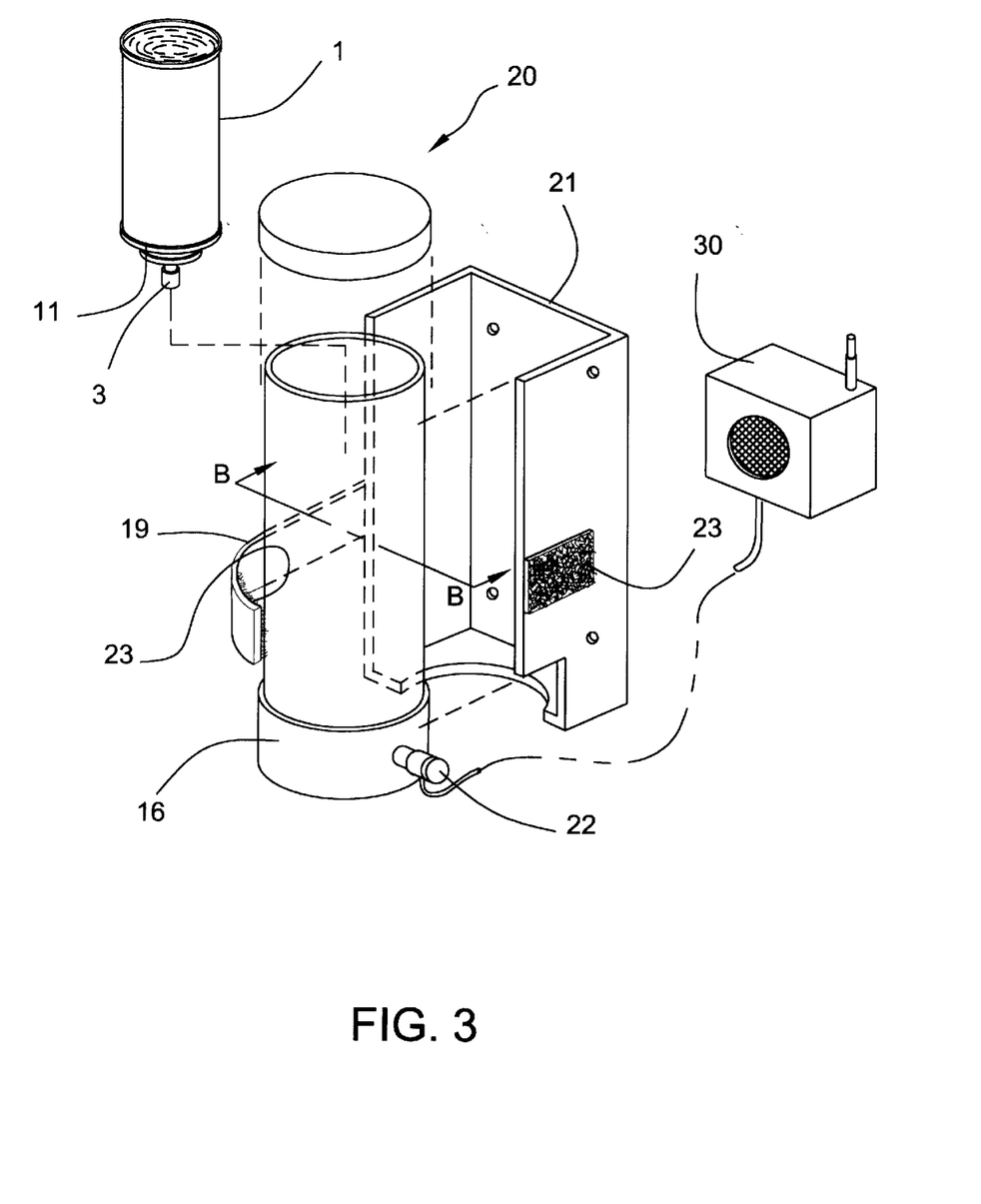
FIG. 3 is a perspective view of an apparatus for selectively increasing the humidity in a predetermined zone from a pressurized container constructed according to one embodiment of the present invention.

In a preferred embodiment, the container mounting means comprises a generally cylindrical structure 16 which is adapted to receive and securely retain the container 1, as exemplified in FIG. 3. In the illustrated embodiment, the cylindrical structure 16 includes an annular flange 18 which serves to properly align and position the container within the cylindrical structure. The annular flange includes a central opening which allows the top of the container including the actuator 3, to extend therethrough. The annular flange 18 is sized so as to contact a ridge portion 11 which extends from a typical aerosol (e.g., paint) container. Unlike the illustrated embodiment wherein the container 1 is held in the inverted position, in another embodiment, the mounting structure 16 could be configured such that container is held in an upright or other position, as the orientation of the container is of no consequence regarding the ability of the container to discharge the aerosol composition into the predetermined zone.

Figure 4:
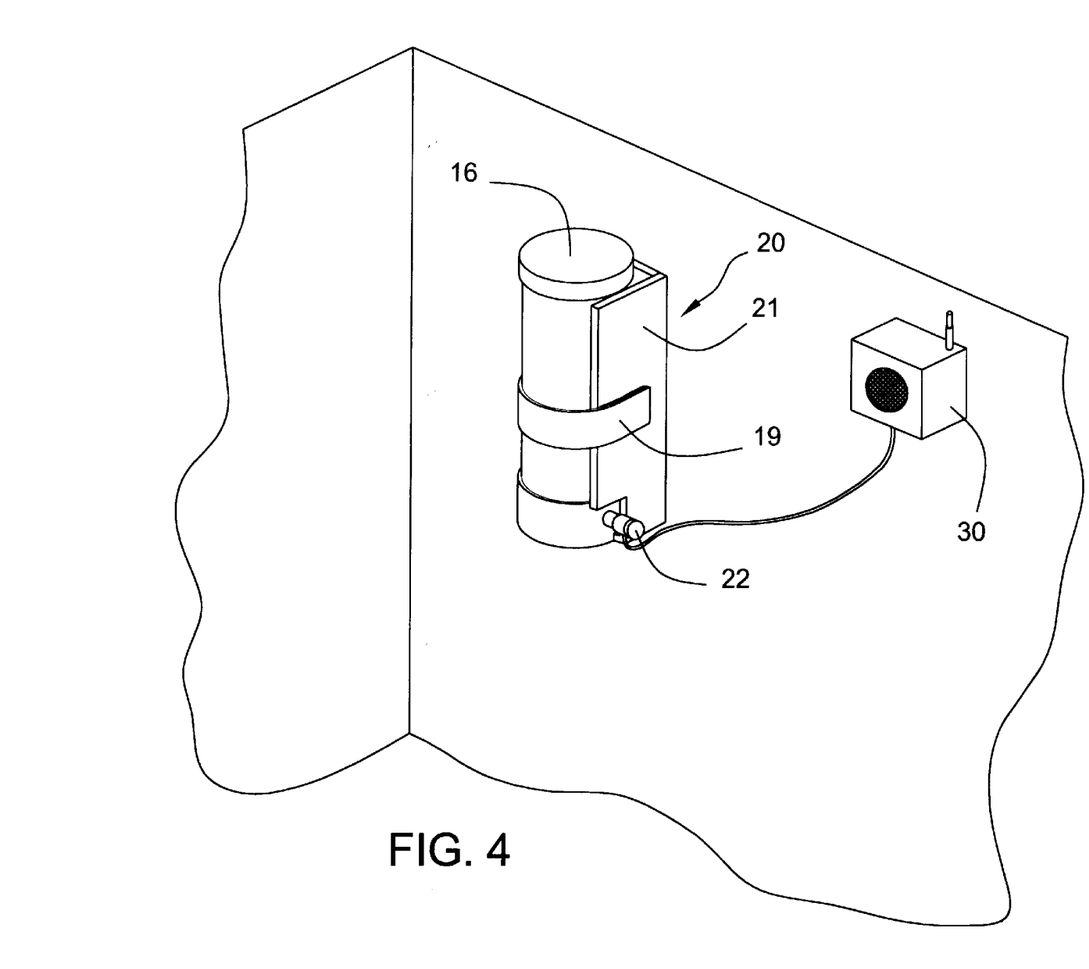
FIG. 4 is perspective view of the dispensing apparatus of FIG. 3 showing how the apparatus could be mounted in an enclosure.

Those skilled in the art will also appreciate that the container 1 could also be mounted in any number of different locations. For example, the aerosol container 1 could be mounted onto a surface which defines the predetermined zone, e.g., a wall of a room as shown in FIG. 4. Alternatively, the container 1 could be mounted to the ceiling of such a room, or outside of the enclosure, e.g., air supply ducts, where the discharged aerosol composition be dispensed within the predetermined zone. In the illustrated embodiment, the cylindrical structure 16 with the container 1 can be mounted on a surface such as a wall via a mounting bracket 21. The mounting bracket 21 is adapted such that the cylindrical structure 16, and with it the container 1, can be easily removed and replaced. In particular, the cylindrical structure 16 is held in the mounting bracket by a strap 19 which is provided with a conventional hook and loop fastener 23.

In order to effectuate movement of the container actuator 3 between the discharging and non-discharging positions, the dispensing apparatus includes electrically-operable actuator. Preferably, the electrically-operable actuator comprises a solenoid 22 that includes an arm 24 mounted to a housing 26, as exemplified in FIG. 5. The solenoid arm 24 is mounted to the solenoid housing 26 so that the solenoid arm 24 can move relative to the solenoid housing between retracted or non-discharging and extended or discharging positions in response to a flow of current to the solenoid 22.

Figure 5:
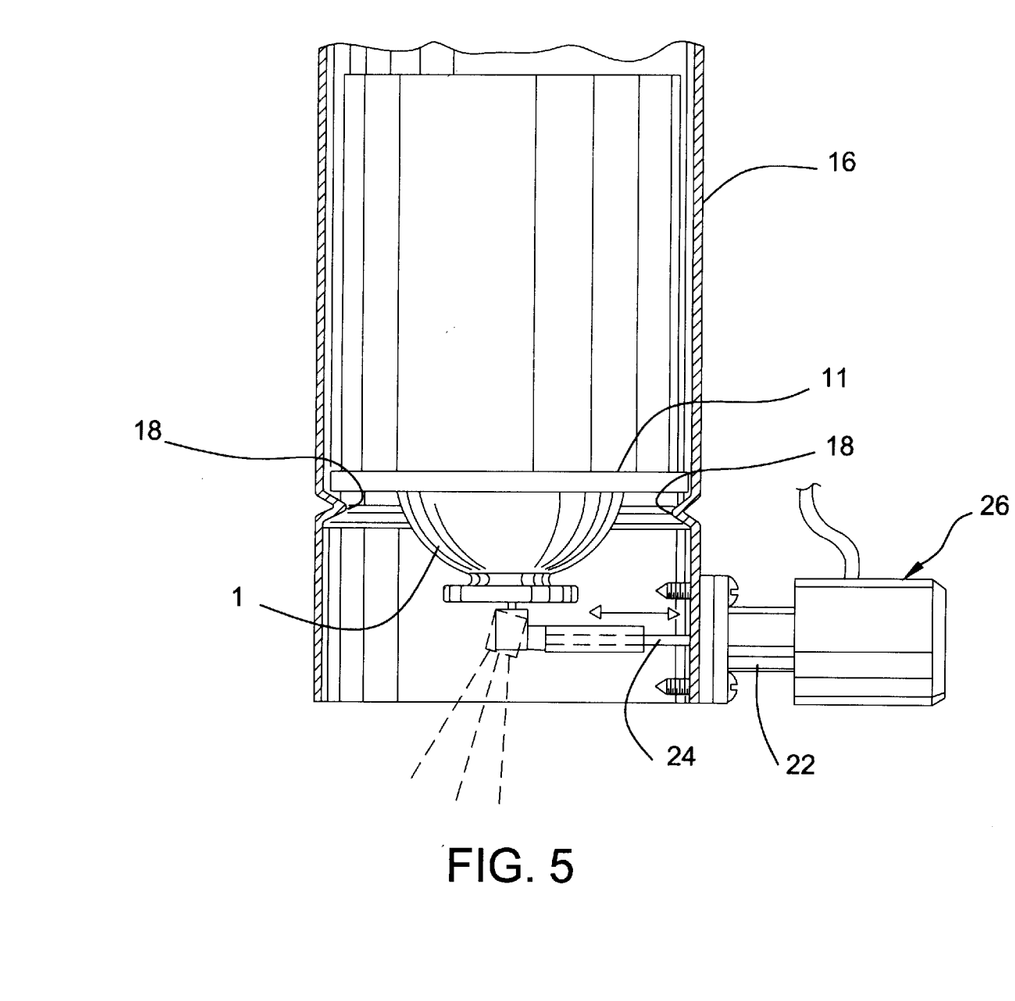
FIG. 5 is a sectional view taken along line B—B of FIG. 3 showing the discharging position of the pressurized container actuator and the extended position of the solenoid arm in broken lines and the non-discharging position of the pressurized container actuator and the retracted position of the solenoid arm in solid lines.

Generally, discharge of the container contents is affected by moving the actuator 3 from its normal, non-discharging position into a discharging position, wherein the spring-biased container valve (not shown) is opened. While various types of actuators and biased valves may be used, and are well known in the art, valves that are opened when the actuator is moved laterally with respect to the longitudinal axis of the container are preferred. Of course, and as will be appreciated by those skilled in the art, the electrically-operable actuator could be designed to accommodate one or more types of aerosol container valve and actuator combinations.

In the illustrated embodiment, when the solenoid 22 is energized, the arm 24 extends outwardly from the solenoid 22 in a direction transverse to the longitudinal axis of the container actuator 3 into the extended or discharging position, shown in broken lines in FIG. 5. In the extended or discharging position, the solenoid arm 24 effects movement of the aerosol can actuator 3 into the discharging position, thus opening the container valve and allowing aerosol composition in the container to be discharged. When the solenoid 22 is de-energized, a spring (not shown) in the aerosol container valve (not shown) biases the actuator 3 back into the non-discharging position, thereby pushing the solenoid arm 24 back into the retracted or non-discharging position, shown in solid lines in FIG. 4, and closing the container valve.

The dispensing apparatus also includes a sensor 30 disposed in the predetermined zone and in electrical connection with the electrically-operable actuator 22. The sensor may be designed to sense any number of different pre-selected conditions, such as pre-selected periods of time, humidity levels, and the like. When the sensor 30 detects the pre-selected condition, it signals the electrically-operable actuator, the solenoid 22 in the illustrated embodiment, to effect movement of the container actuator 3 into the discharging position, thereby dispensing the aerosol composition into the predetermined zone. The dispensing apparatus 20 can be configured such that the electrically-operable actuator 22 will continue to cause the container 1 to dispense the aerosol composition into the zone until the sensor 30 no longer detects the pre-selected condition. Alternatively, the dispensing apparatus 20 can be configured such that when the electrically-operable actuator 22 receives a signal from the sensor 30 it will cause the aerosol container 1 to dispense the aerosol composition into the zone for a predetermined interval, e.g., 1–30 seconds.

Preferably, the sensor is designed for detecting a pre-selected humidity level (e.g., relative humidity, absolute humidity) of the atmosphere in the predetermined zone. The sensor is chosen such that when it detects the selected humidity level, it will forward a signal to the electrically-operable actuator that aerosol composition should be dispensed into the zone. For example, in one embodiment, the sensor 30 may comprise one or more humidity sensors which signal the electrically-operable actuator when the level of humidity in the ambient atmosphere in the zone drops below a predetermined level. Generally, humidity levels between about 40% and about 70% are considered acceptable by most humans. When humidity levels drop below about 40%, the result is a feeling of dryness, chapping, and dried mucous membranes with reduced disease resistance and dust filtering ability. Humidity levels in excess of about 70%, although not physically harmful, may result in damp or sticky air, thereby causing a general feeling discomfort or anxiety. Thus, in a preferred embodiment, the sensor signals the electrically-operable actuator when the humidity level drops below about 40%. In addition, the sensor could also be adapted such that it signals the electrically-operable actuator to stop dispensing the aerosol composition when the humidity level reaches about 70%. In addition to signaling the electrically-operable actuator when the humidity level drops below the predetermined level, the sensor could also be configured to sound an alarm.

Those skilled in the art will appreciate that any number of commercially available humidity sensors could be used in the present invention without adversely effecting the performance and other advantages of the present invention.

In an alternative embodiment, instead of utilizing a humidity sensor, a sensor designed to detect periods of time (e.g., timer) could be provided in electrical connection with the electrically-operable actuator 22. More particularly, the sensor could be configured to signal the electrically-operable actuator at a predetermined interval (e.g., every hour, every two hours, or every four hours) in order to dispense the aerosol composition into the predetermined zone at a regular interval. Such an arrangement may be preferable in environments where regular dispensing of the aerosol composition is desirable, e.g., offices, motor homes, hospital rooms, etc.

Multiple dispensing apparatuses may be provided in a given zone. In addition, a dispensing apparatus having multiple sensors could be provided.

Alternatively, multiple dispensing apparatuses could share the same sensor such that the aerosol composition would be dispensed from multiple aerosol containers when the sensor detects the pre-selected condition.

Turning to the aerosol composition, the present invention contemplates an aerosol composition consisting essentially of water and a liquid propellant. The water component may be of a form of water being substantially free of other liquids or contaminants. In other words, the term "water" as used herein is intended to include distilled water, tap water, purified water, and other compositions of water suitable for human exposure in accordance with commercially-established standards of water quality. The preferred water is distilled water, due to its purity and availability.

The use of a liquid propellant in the present system assists in the discharge of a liquid as an aerosol from the container. The liquid propellant component contemplated by the present invention includes any type of liquid propellant or mixture of liquid propellants that will aerosolize the water. By use of the term "liquid propellant," it is contemplated that such propellant is gaseous at room temperature but liquid under pressures found within an aerosol container. The propellant should also be inert, i.e., it should not react with the container or other components of the composition.

Although any propellant which remains liquid under the pressures experienced in the aforesaid containers is suitable for the present invention, the non-halogenated hydrocarbons, e.g., methane, ethane, propane, butane, isobutane, as well as dimethyl ether, and mixtures thereof, liquids, are advantageously used. The halogenated hydrocarbons, e.g., Freon 12, may also be used, but are not preferred. Mixtures of these propellants are also acceptably included into the present composition. In addition, it is not critical to the invention whether a water-miscible or water-immiscible liquid propellant is used so long as the composition emerges from the container as an aerosol.

The preferred propellants are non-halogenated hydrocarbons.

The liquid propellants described above should generally be present in an amount which is sufficient to evacuate the total amount of liquid present in the container. The sufficiency of liquid propellant in an aerosol container is typically determined by reference to the vapor pressure inside the container. If a standard aerosol container is used, as discussed previously, the liquid propellant should be present in an amount such that the initial pressure in the container ranges from about 30 psig to about 180 psig at 70° F. Advantageously, the liquid propellant will be present to provide an initial container pressure ranging from about 50 psig to about 160 psig, preferably the initial pressure will range from about 100 psig to about 140 psig. Of course, the degree of pressure exerted on a given container will vary in accordance with the container's pressure rating as well as the intended use of the container and liquid contained therein.

In order to reach the aforesaid pressures, the liquid propellant is generally present in an amount ranging from about 5 to about 40 weight percent (wt. %) of the total composition. Preferably, about 15 to about 25 wt. % of liquid propellant will be in the composition and most preferably about 18 to about 22 wt. %. If, for example, dimethyl ether is used, amounts at the higher end of the range will be necessary due to its characteristic lowering of vapor pressure upon exposure to solvents, such as water. Most liquid hydrocarbons do not suffer from this loss of vapor pressure effect and may therefore be present in amounts ranging toward the lower ends of the aforesaid ranges. Further, the other propellants are typically less expensive than dimethyl ether and are less flammable, such that non-hydrocarbons other than the ethers are the preferred propellants.

The present invention also provides a related method for increasing the humidity in a predetermined zone. The method comprises (a) sensing a pre-selected condition in a predetermined zone; and (b) dispensing a composition consisting essentially of water and a liquid propellant from a disposable, hand-held, aerosol-type, pressurized container into the predetermined zone when the pre-selected condition is sensed.

The phrase "predetermined zone" as used herein is generally intended to include pockets of air surrounding a user's person having a fixed volume. These pockets of air, or zones, may include both open and enclosed spaces. An enclosed space is a pocket of air surrounding a user's person having a fixed volume defined by rigid boundaries, such as walls. By way of example and not by way of limitation, the passenger cabin of a motor vehicle, a train, an airplane, and the like, as well as the interiors of hotel rooms, offices, elevators, and the like are considered to be enclosed spaces within the meaning of the term "zone."

In addition to enclosed spaces, the term "zone" also includes air having a fixed volume defined by imaginary boundaries, e.g., the volume of air immediately surrounding a user's person (e.g., entire body) or part of a user's person (e.g., face). The volume of air immediately surrounding an individual's person extending about five feet from the individual's person is considered to be the outer boundary of an open space within the meaning of the term "zone." Preferably, the zone extends about three feet from a user's face. More preferably, the zone extends about one foot from a user's face.

The pre-selected condition may be any number of conditions selected by the user to be sensed. For example, the user may select as a pre-selected condition the humidity level in a predetermined zone. Alternatively, the user may select as a pre-selected condition a period of time, such as one minute or two hours. It is not critical to the present inventive method what pre-selected condition is selected, so long as the user is able to sense the pre-selected condition.

Sensing the pre-selected condition in a predetermined zone may be achieved by any sensing means, such as electrical or mechanical sensors, or by human senses. For example, in regards to human senses, a user may sense undesirably low levels of humidity within a zone by a general feeling of dryness or by electrical discharges upon touching metallic or electric devices. Likewise, the user may sense a period of time by, for example, noting the time of day or referencing a timepiece. This human sensing means is preferred when sensing the pre-selected condition in a predetermined zone having imaginary boundaries.

Alternatively, in regards to a mechanical or electrical sensor, a sensor may be disposed in the predetermined zone and in electrical connection with an electrically-operable actuator for detecting a pre-selected condition in the predetermined zone. When the sensor detects the pre-selected condition, the sensor signals the electrically-operable actuator to move an arm to displace a pressurized container actuator so that a biased valve is moved into the discharging position, thereby providing an aerosol composition to be discharged as an aerosolized liquid into the predetermined zone. This particular sensing means is preferred when sensing the humidity level in a predetermined zone having rigid boundaries.

It is not critical to the present inventive method what sensing means are utilized, so long as the user is able to approximate whether the pre-selected condition within the predetermined zone is above (before), below (after) or equal to a pre-selected condition.

When the pre-selected condition is sensed, the aerosol composition may be dispensed from the pressurized container either manually or automatically. To dispense the composition manually, the user may apply force to the container actuator, thereby moving the biased valve into the discharging position. To dispense the composition automatically, the user may, as previously described herein, utilize sensors and electrically-operable actuators to automatically move the container actuator, thereby automatically moving the biased valve into the discharging position.

Upon discharge, the user may manually or automatically dispense the aerosol composition for a period of time, or until the selected humidity level is no longer sensed.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. For example, the preferred container design is merely illustrative of those that may be utilized in the present invention. Other suitable designs and constructions of these components may also be used. Accordingly, this invention includes all modifications encompassed within the spirit and scope of the invention as defined by the following claims.

What is claimed is:

1. A portable apparatus for selectively increasing the humidity in a predetermined zone comprising:

a disposable, hand-held, aerosol-type container;

an aerosol composition consisting essentially of water and a liquid propellant in the container;

a valve comprising an inlet and an outlet for controlling the discharge of the aerosol composition from the container, the valve being biased in a non-discharging position and being movable to a discharging position, wherein the inlet of the valve is in communication with the container such that the aerosol composition can flow from the container through the valve;

an actuator in fluid communication with the outlet of the valve such that the aerosol composition can flow from the outlet of the valve through the actuator and outwardly from the container, wherein movement of the actuator results in movement of the valve into a discharging position;

means for mounting the pressurized container such that upon movement of the actuator, the valve is moved into the discharging position and the aerosol composition is dispensed from the pressurized container through the valve and actuator and into the predetermined zone;

electrically-operable actuator comprising a solenoid mounted adjacent the actuator and an arm attached to the solenoid, the arm being moveable relative to the actuator between discharging and non-discharging positions, wherein when the arm is in the discharging position. The arm displaces the actuator and thereby moves the biased valve into the discharging position, and when the arm is in the non-discharging position, the arm is positioned to allow the biased valve to reside in the non-discharging position; and a sensor disposed in the predetermined zone and in electrical connection with the actuator for detecting a pre-selected condition in the predetermined zone, wherein when the sensor detects the pre-selected condition, the sensor signals the actuator to move the arm into the discharging position and thereby displace the pressurized container actuator so that the biased valve is moved into the discharging position, thereby providing the aerosol composition to be discharged as an aerosolized liquid into the predetermined zone, wherein the apparatus is capable of being transported as a unit from one predetermined zone to another predetermined zone and used to discharge aerosolized water into each such zone.

2. The apparatus of claim 1, wherein the mounting means comprises a bracket which supports a generally cylindrical structure which is adapted to retain the pressurized container within the structure.

3. The apparatus of claim 1, wherein the pre-selected condition is a time period, and when the sensor detects the passage of a time period, the electrically-operable actuator moves the actuator and thus the biased valve into the discharging position.

4. The apparatus of claim 1, wherein the pre-selected condition is a humidity level in the predetermined zone, and when the sensor detects the pre-selected humidity level, the electrically-operable actuator moves the actuator and thus the biased valve into the discharging position.

5. The apparatus of claim 4, wherein the pre-selected condition is a humidity level in the predetermined zone, and when the sensor detects the pre-selected humidity level, the electrically-operable actuator moves the actuator and thus the biased valve into the discharging position until the humidity level exceeds the pre-selected humidity level.

6. A method for increasing the humidity in a predetermined zone comprising:

(a) sensing a predetermined selected condition in a predetermined zone; and (b) dispensing a composition consisting essentially of water and a liquid propellant from a portable apparatus into the predetermined zone when the pre-selected condition is sensed, the apparatus comprising a disposable, hand-held, aerosol-type container;

an aerosol composition consisting essentially of water and a liquid propellant in the container;

a valve comprising an inlet and an outlet for controlling the discharge of the aerosol composition from the container, the valve being biased in a non-discharging position and being movable to a discharging position, wherein the inlet of the valve is in communication with the container such that the aerosol composition can flow from the container through the valve;

an actuator in fluid communication with the outlet of the valve such that the aerosol composition can flow from the outlet of the valve through the actuator and outwardly from the container, wherein movement of the actuator results in movement of the valve into a discharging position;

means for mounting the pressurized container such that upon movement of the actuator, the valve is moved into the discharging position and the aerosol composition is dispensed from the pressurized container through the valve and actuator and into the predetermined zone;

electrically-operable actuator comprising a solenoid mounted adjacent the actuator and an arm attached to the solenoid, the arm being moveable relative to the actuator between discharging and non-discharging positions, wherein when the arm is in the discharging position, the arm displaces the actuator and thereby moves the biased valve into the discharging position, and when the arm is in the non-discharging position, the arm is positioned to allow the biased valve to reside in the non-discharging position; and a sensor disposed in the predetermined zone and in electrical connection with the actuator for detecting a pre-selected condition in the predetermined zone, wherein when the sensor detects the pre-selected condition, the sensor signals the actuator to move the arm into the discharging position and thereby displace the pressurized container actuator so that the biased valve is moved into the discharging position, thereby providing the aerosol composition to be discharged as an aerosolized liquid into the predetermined zone, wherein the apparatus is capable of being transported as a unit from one predetermined zone to another predetermined zone and used to discharge aerosolized water into each such zone.

7. The method according to claim 6, wherein the water is distilled water.

8. The method according to claim 6, wherein the liquid propellant is a non-halogenated hydrocarbon.

9. The method according to claim 6, wherein the predetermined zone extends about 3 feet from a user's face.

10. The method according to claim 9, wherein the predetermined zone extends about one foot from a user's face.

11. The method according to claim 6, wherein the predetermined zone is the passenger cabin of a motor vehicle.

12. The method according to claim 6, wherein the predetermined zone is the interior of hotel room.

13. The method of claim 6, wherein the pre-selected condition is a period of time.

14. The method of claim 6, wherein the pre-selected condition is the humidity level of the predetermined zone.

* * * * *